United States Patent [19]

Nakata et al.

[11] Patent Number: 5,252,805
[45] Date of Patent: Oct. 12, 1993

[54] LASER BEAM MACHINING METHOD

[75] Inventors: Yoshinori Nakata, Minamitsuru; Etsuo Yamazaki, Kitatsuru; Norio Karube, Machida; Tsuyoshi Nagamine, Hachioji, all of Japan

[73] Assignee: Fanuc Ltd, Minamitsuru, Japan

[21] Appl. No.: 852,184

[22] PCT Filed: Oct. 5, 1991

[86] PCT No.: PCT/JP91/01371
§ 371 Date: May 29, 1992
§ 102(e) Date: May 29, 1992

[87] PCT Pub. No.: WO92/06815
PCT Pub. Date: Apr. 30, 1992

[30] Foreign Application Priority Data

Oct. 18, 1990 [JP] Japan .................... 2-280010

[51] Int. Cl.$^5$ ............................................ B23K 26/00
[52] U.S. Cl. ........................ 219/121.72; 219/121.61
[58] Field of Search ................... 219/121.61, 121.67, 219/121.72, 121.69, 121.82

[56] References Cited

U.S. PATENT DOCUMENTS 5,182,434  1/1993  Nakata ..................... 219/121.72

FOREIGN PATENT DOCUMENTS 63-115687  5/1988  Japan .
02-179373  3/1990  Japan .

Primary Examiner—C. L. Albritton
Attorney, Agent, or Firm—Staas & Halsey

[57] ABSTRACT

A laser beam machining method for cutting a workpiece in accordance with a machining program composed of a succession of move commands and laser output commands. An angle of a machining path is calculated on the basis of a move command under execution and a subsequent read out move command (S2, S3). The angle of the machining path is compared with a preset angle (S4), and when the angle of the machining path is more acute than the preset angle, the movement for machining based on the move command under execution is decelerated and stopped (S5). In this case, the laser output command is changed from a cutting condition to a piercing condition, to carry out a piercing operation, and when the piercing operation is completed, the movement for machining is restarted in accordance with the subsequent move command. When the movement for machining is restarted, the laser output command is changed from the piercing condition to the cutting condition in accordance with the movement for machining. Accordingly, a clean-cut acute-angle portion can be obtained by this machining.

7 Claims, 8 Drawing Sheets

LASER BEAM MACHINING METHOD

DESCRIPTION

1. Technical Field

This invention relates to a laser beam machining method used for cutting a workpiece, and more particularly, to a laser beam machining method enabling a clean-cut machining of an acute-angle portion.

2. Background Art

When cutting a workpiece to form an acute-angle portion by using a laser beam, often a clean-cut machining cannot be achieved because an edge of the acute-angle portion is overheated and melted due to an excessive heating of that portion, and therefore, a loop machining method, as illustrated in FIG. 7, is employed. As shown in the figure, when carrying out a cutting operation along a machining path 52 including an acute-angle portion 51, the cutting is continued past a point C of the acute angle, the cutting point is moved along a predetermined loop 53 and returned to the point C, and the cutting operation then restarted along the original machining path 52.

Although this loop machining method can be applied to a case in which a product to be obtained is an acute-angle piece inside the machining path 52, it has a drawback in that it cannot be applied to a case in which the product is an obtuse-angle piece outside the machining path 52, and further, an extra machining program is required for the movement of the cutting point along the loop 53.

DISCLOSURE OF THE INVENTION

This invention was created in view of the above circumstances, and an object thereof is to provide a laser beam machining method enabling a clean-cut machining of an acute-angle portion without using the loop machining method.

To achieve the above object, this invention provides a laser beam machining method for cutting a workpiece in accordance with a machining program composed of a succession of move commands and laser output commands, comprising the steps of calculating an angle of a machining path in accordance with a move command under execution and a subsequent read out move command, comparing the angle of the machining path with a preset angle, decelerating and stopping a movement for machining based on the move command under execution when the angle of the machining path is more acute than the preset angle, changing the laser output command from a cutting condition to a piercing condition in accordance with the deceleration and stoppage of the movement for machining, restarting the movement for machining in accordance with the subsequent move command when a piercing operation according to the piercing condition is completed, and changing the laser output command from the piercing condition to the cutting condition in accordance with the movement for machining, when the movement for machining is restarted.

An angle of the machining path is calculated on the basis of a move command under execution and the subsequent move command read out. The angle of the machining path is compared with the preset angle, and when the former is more acute than the latter, the movement for machining based on the move command under execution is decelerated and stopped. In this case, the laser output command is changed from the cutting condition to the piercing condition, to carry out a piercing operation according to the piercing condition, and when the piercing operation is completed, the movement for machining is restarted in accordance with the next move command. When the movement for machining is restarted, the laser output command is changed from the piercing condition to the cutting condition in accordance with the movement for machining.

BRIEF DESCRIPTION OF THE DRAWINGS

FIG. 1($b$) is a flowchart of a laser output command rewrite process according to the laser beam machining method of this invention;

BEST MODE OF CARRYING OUT THE INVENTION

Embodiments of this invention will be described with reference to the drawings.

Figure 2:
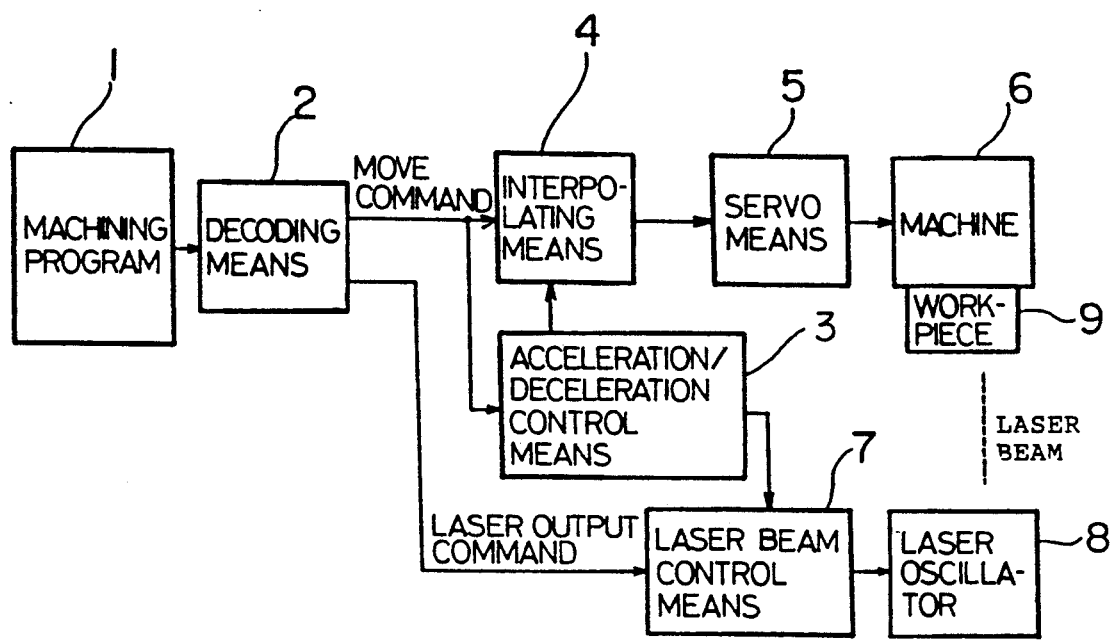
FIG. 2 is a block diagram illustrating the laser beam machining method of this invention.

FIG. 2 is a block diagram illustrating a laser beam machining method according to this invention. As shown in the figure, a machining program 1 is decoded by a decoding means 2, and then separated into move commands and laser output commands. The move commands are supplied to an acceleration/deceleration control means 3 and then to an interpolating means 4, to be distributed to individual axes for controlling respective servomotors of a servo means 5. A machine (table, etc.) is driven by the servomotors.

The laser output command is converted into a command signal for a laser oscillator 8 by a laser beam control means 7, and is used to control the output of a laser beam (laser output) emitted from the laser oscillator 8. A workpiece 9 is cut by using this laser beam.

The laser beam control means 7 reads a signal from the acceleration/deceleration control means 3, and outputs a command signal to the laser oscillator 8 in accordance with the received signal, to thereby control the laser output, as described in detail later.

Figure 3:
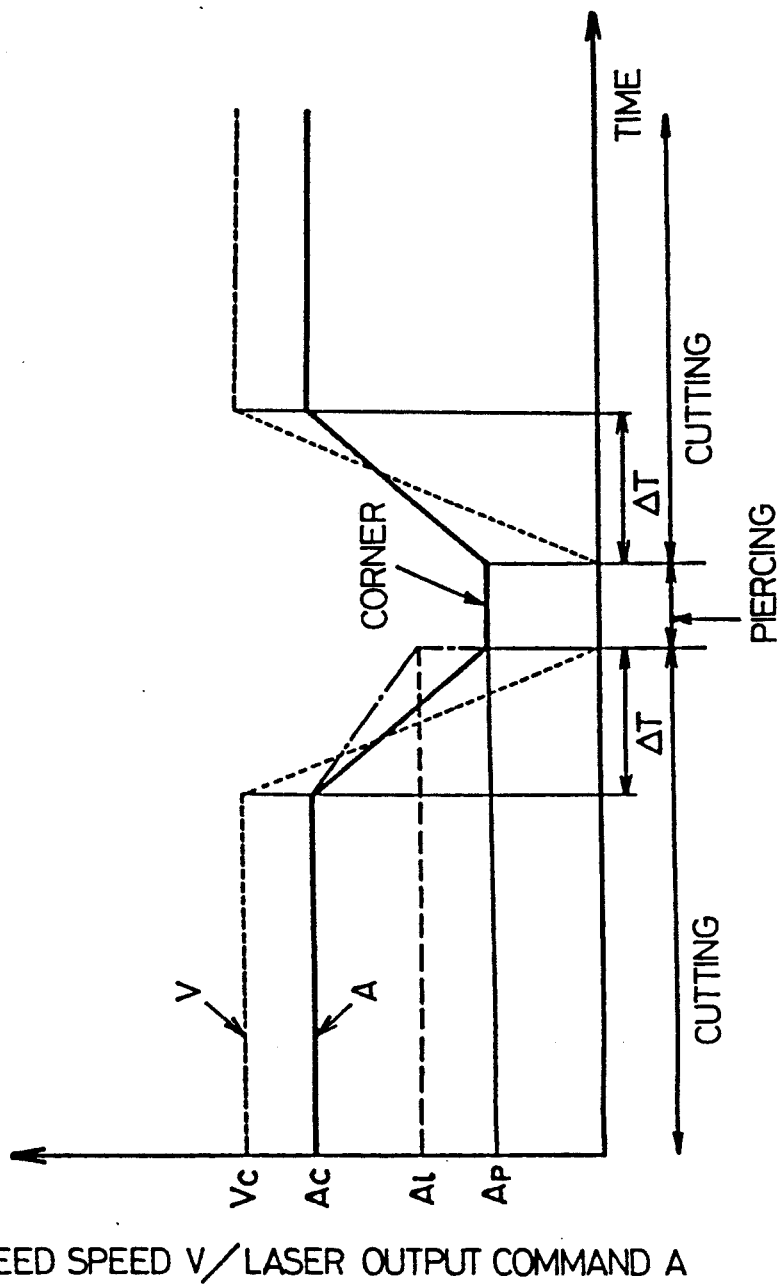
FIG. 3 is a timing chart illustrating the laser beam machining method of this invention.

FIG. 3 is a timing chart illustrating the laser beam machining method according to this invention.

Here, first a cutting operation is carried out along a predetermined machining path (not shown). Namely, a feed speed V is controlled to Vc by the move command, and a laser output command A determines a power S, pulse frequency P, and duty factor Q of the high-frequency electric pulse supplied to the laser oscillator; in the illustrated case, sets a cutting condition Ac (e.g., power Sc=1000 W, pulse frequency Pc=1000 Hz, duty factor Qc=80%).

Next, an angle of the machining path is calculated on the basis of the move command under execution and a subsequent move command. If it is determined that the angle of the machining path is more acute than a set angle, i.e., it is determined that a corner (acute-angle portion) exists, the movement for machining at the feed speed Vc based on the move command under execution is decelerated and stopped within a time ΔT.

In this case, the laser output command A is changed in accordance with a change of deceleration of the feed speed V, and as a result, the laser output command A changes from the cutting condition Ac to a piercing condition Ap (e.g., power Sp=500 W, Pulse frequency Pp=45 Hz, duty factor Qp=15%).

Therefore, the speed at the corner is zero, the machining mode is switched from a cutting mode to a piercing mode, and the laser beam is passed through the workpiece perpendicularly thereto.

After the piercing operation is completed, the next move command is read, and the cutting operation is started again from the corner along the predetermined machining path in accordance with the move command. In this case, the feed speed V is accelerated, and reaches Vc again after a lapse of the time ΔT.

Further, the laser output command A is changed in accordance with a change in the feed speed V, i.e., is changed from Ap to Ac, and in accordance with this laser output command Ac, the cutting operation is again carried out along the predetermined machining path.

As described above, in this embodiment, when the feed speed V is decelerated before reaching a corner, and is accelerated after the corner has been passed, the laser output command A is changed in accordance with a change in the feed speed V, and accordingly, the quantity of heat applied to the corner can be property controlled. Further, the speed is made zero at the corner, a piercing operation is carried out by passing the laser beam perpendicularly through the workpiece, and thereafter, the feed direction is changed, whereby a sharp cut edge of the workpiece can be made from the upper to bottom surface thereof, and accordingly, a sharp corner is obtained without using the loop machining method.

In the above description, when the feed speed V is decelerated and made zero, the laser output command A is changed from the cutting condition Ac to the piercing condition Ap, but the laser output command A may be once changed to an intermediate condition Ai between Ac and Ap, and then switched from Ai to Ap at the same time that the speed becomes zero, to thereby further facilitate the control of the quantity of heat applied to a corner at a deceleration and stoppage of the movement for machining.

Figure 1A:
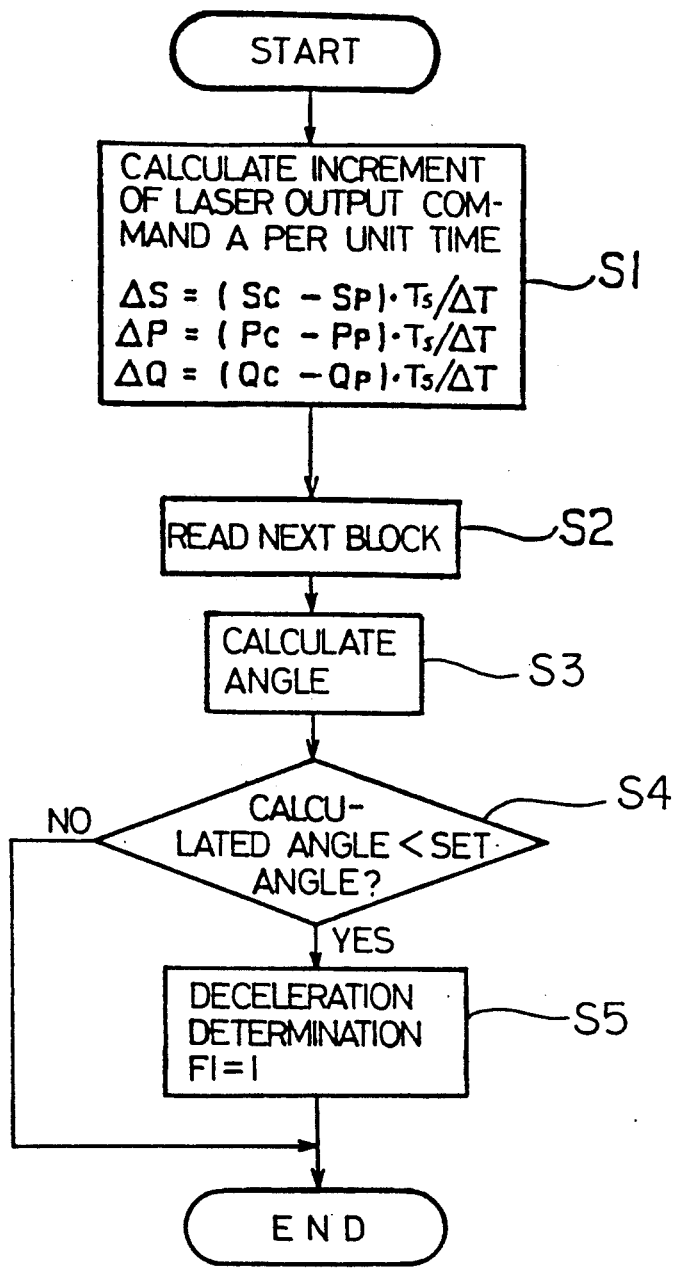
FIG. 1($a$) is a flowchart of a deceleration determination process according to a laser beam machining method of this invention.

FIG. 1(a) is a flowchart of a deceleration determination process according to the laser beam machining method of this invention. In the figure, numbers following "S" denote step numbers.

[S1] An increment of the laser output command A per unit time is calculated by the following equations (1):

$$\Delta S = (Sc - Sp) \cdot Ts/\Delta T$$
$$\Delta P = (Pc - Pp) \cdot Ts/\Delta T \quad (1)$$
$$\Delta Q = (Qc - Qp) \cdot Ts/\Delta T$$

[S2] The next block (move command) is read.

[S3] The angle is calculated.

[S4] It is determined whether or not the calculated angle is smaller than the set angle. If the calculated angle is smaller than the set angle, it is determined that an acute corner exists and the program proceeds to Step S5. If not, the execution of the program is ended.

[S5] A deceleration determination flag F1 is set to "1."

Figure 1B:
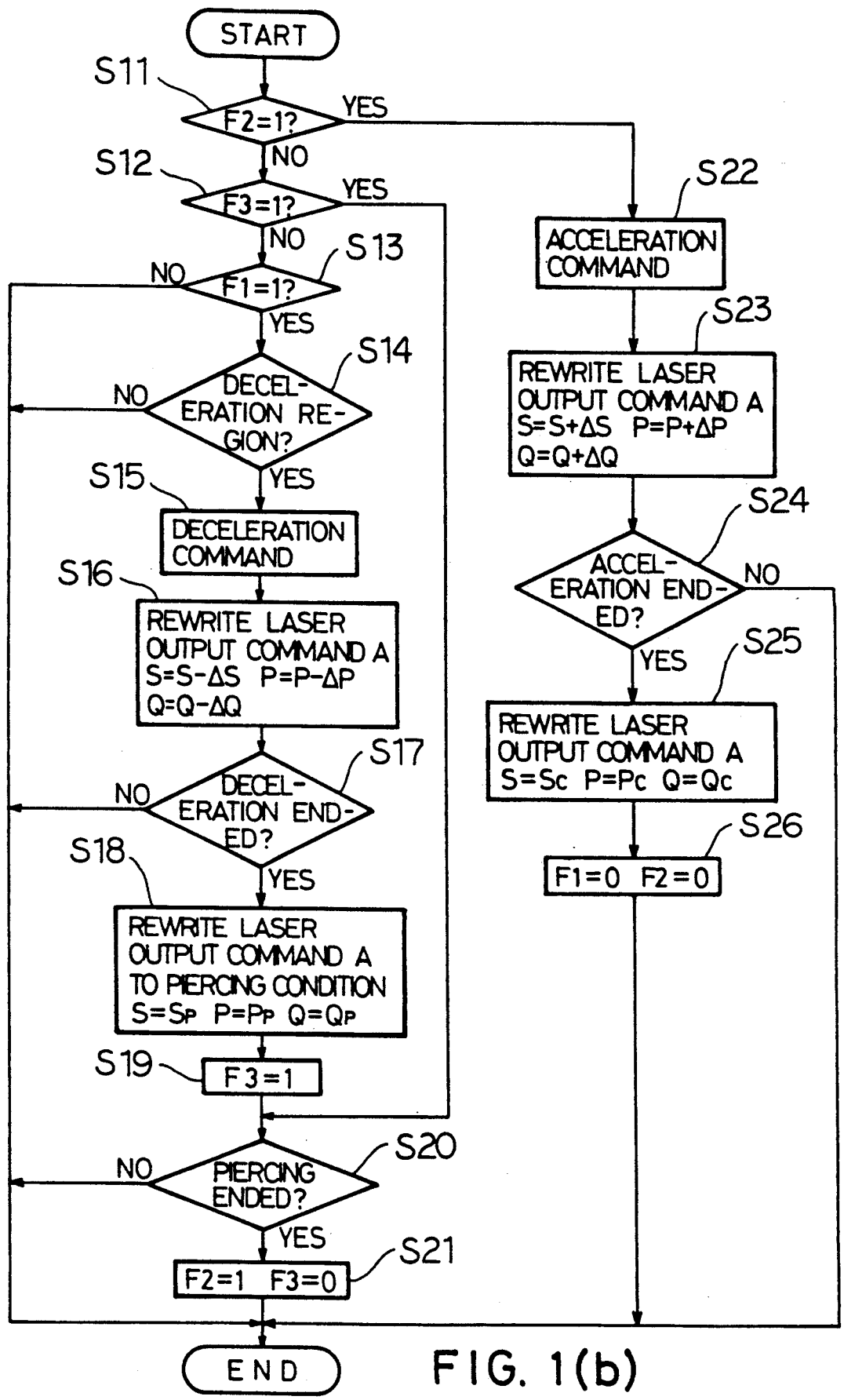

FIG. 1(b) is a flowchart of a laser output command rewrite process according to the laser beam machining method of this invention. This program is executed at intervals of time 1/Ts after the flowchart of FIG. 1(a) has been executed.

[S11] It is determined whether or not a piercing end determination flag F2 is "1." If the flag is "1," the program proceeds to Step S22, and if the flag is zero, the program proceeds to Step S12.

[S12] It is determined whether or not a flag F3 for determining the end of the rewrite of the piercing condition is "1." If the flag is "1," the program proceeds to Step S20, and if the flag is zero, the program proceeds to Step S13.

[S13] It is determined whether or not the deceleration determination flag F1 is "1." If the flag is "1," the program proceeds to Step S14, and if the flag is zero, the execution of the program is ended.

[S14] It is determined whether or not the movement for machining based on the block (move command) under execution has reached a predetermined deceleration region. If the deceleration region has been reached, the program proceeds to Step S15.

[S15] The feed speed V is controlled in accordance with the deceleration command.

[S16] The laser output command A is rewritten according to the following equations (2):

$$S = S - \Delta S$$
$$P = P - \Delta P \quad (2)$$
$$Q = Q - \Delta Q$$

[S17] It is determined whether or not the deceleration has been ended. If the deceleration is ended, the program proceeds to Step S18, and if not, the execution of the program is ended.

[S18] The laser output command A is rewritten to the piercing condition (S=Sp, P=Pp, Q=Qp).

[S19π] The flag F3 for determining the end of the rewrite of the piercing condition is set to "1."

[S20] It is determined whether or not the piercing operation has ended. If the piercing has ended, the program proceeds to Step S21, and if not, the execution of the program is ended.

[S21] The piercing end determination flag F2 is set to "1," and the flag F3 for determining the end of the rewrite of the piercing condition is set to zero.

[S22] The feed speed V is controlled in accordance with the acceleration command.

[S23] The laser output command A is rewritten according to the following equations (3):

$$S = S + \Delta S$$
$$P = P + \Delta P \quad (3)$$
$$Q = Q + \Delta Q$$

[S24] It is determined whether or not the acceleration has ended. If the acceleration has ended, the program proceeds to Step S25, and if not, the execution of the program is ended.

[S25] The laser output command A is rewritten to the cutting condition (S=Sc, P=Pc, Q=Qc).

[S26] The deceleration determination flag F1 and the piercing end determination flag F2 are both set to zero.

Figure 4:
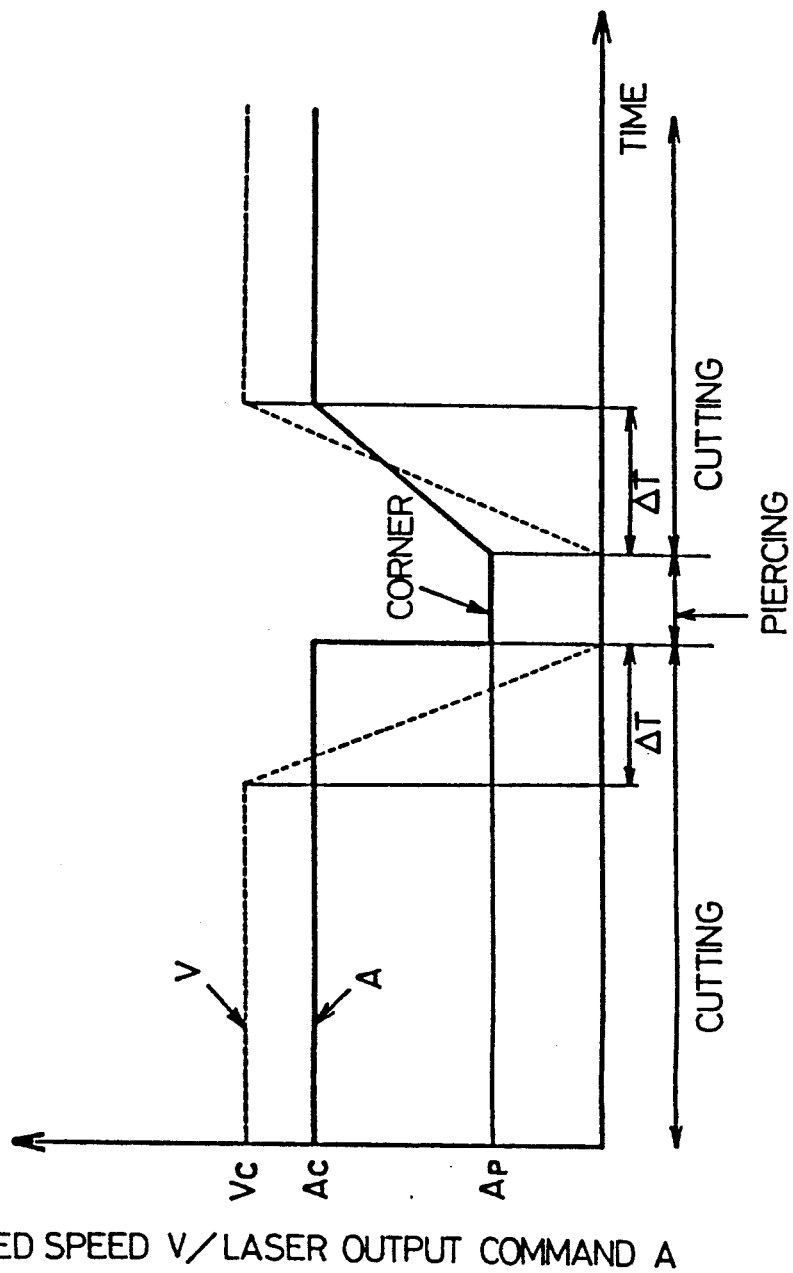
FIG. 4 is a timing chart illustrating a laser beam machining method according to another embodiment of this invention.

FIG. 4 is a timing chart illustrating a laser beam machining method according to another embodiment of this invention.

This embodiment differs from the first embodiment in that, when the movement for machining is decelerated and stopped, the laser output command A is first maintained at the cutting condition Ac during the deceleration and is changed to the piercing condition Ap simultaneously with the stoppage, whereby a quantity of heat sufficient to carry out the machining operation up to the corner is ensured.

Figure 5:
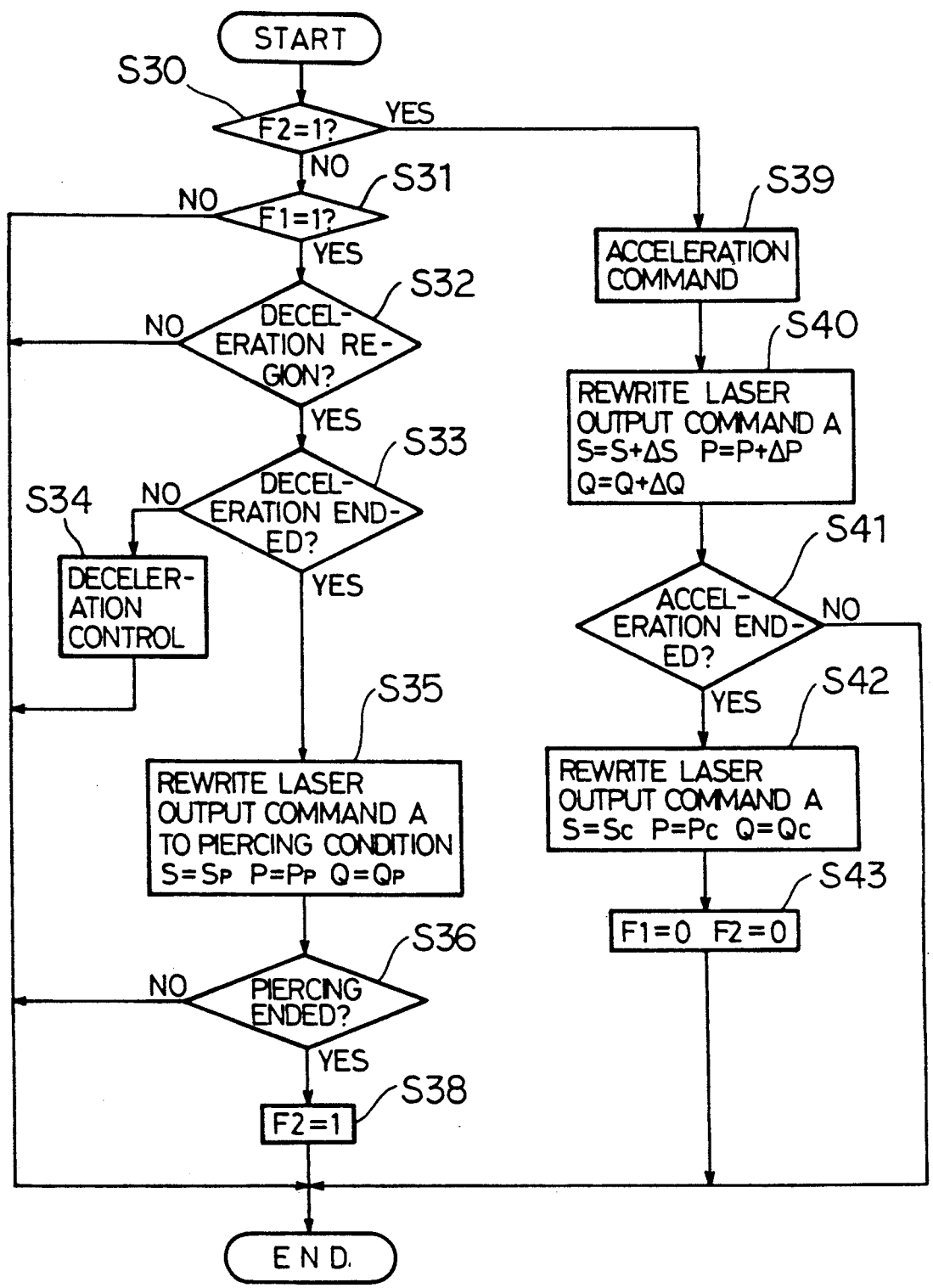
FIG. 5 is a flowchart of a laser output command rewrite process executed in the embodiment shown in FIG. 4.

FIG. 5 is a flowchart of a laser output command rewrite process executed in the embodiment shown in FIG. 4. As for the flowchart of FIG. 1(b), this program is executed at intervals of a time 1/Ts after the flowchart of FIG. 1(a) has been executed.

[S30] It is determined whether or not the piercing end determination flag F2 is "1." If the flag is "1," the program proceeds to Step S39, and if the flag is zero, the program proceeds to Step S31.

[S31] It is determined whether or not the deceleration determination flag F1 is "1." If the flag is "1," the program proceeds to Step S32, and if the flag is zero, the execution of the program is ended.

[S32] It is determined whether or not the movement for machining based on the block (move command) under execution has reached a predetermined deceleration region. If the deceleration region has been reached, the program proceeds to Step S33.

[S33] It is determined whether or not the deceleration has ended. If the deceleration has ended, the program proceeds to Step S35, and if not, the program proceeds to Step S34.

[S34] The feed speed V is controlled in accordance with the deceleration command.

[S35] The laser output command A is rewritten to the piercing condition (S=Sp, P=Pp, Q=Qp).

[S36] It is determined whether or not the piercing operation has ended. If the piercing has ended, the program proceeds to Step S38, and if not, the execution of the program is ended.

[S38] The piercing end determination flag F2 is set to "1."

[S39] The feed speed V is controlled in accordance with the acceleration command.

[S40] The laser output command A is rewritten according to the equations (3).

S41] It is determined whether or not the acceleration has ended. If the acceleration has ended, the program proceeds to Step S42, and if not, the execution of the program is ended.

[S42] The laser output command A is rewritten to the cutting condition (S=Sc, P=Pc, Q=Qc).

[S43] The deceleration determination flag F1 and the piercing end determination flag F2 are both set to zero.

Figure 6:
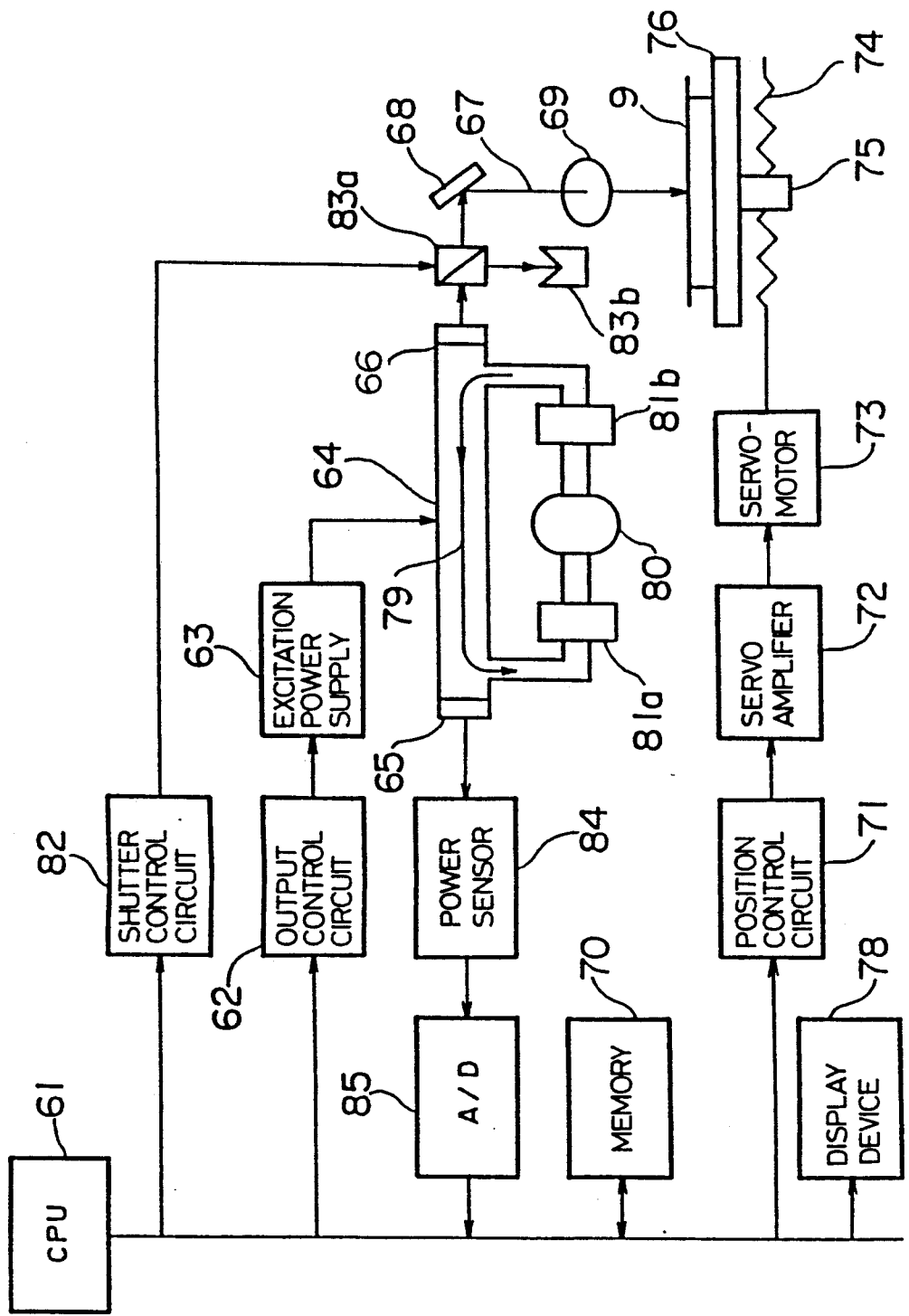
FIG. 6 is a block diagram showing the arrangement of an NC laser device to which this invention is applied.
Figure 7:
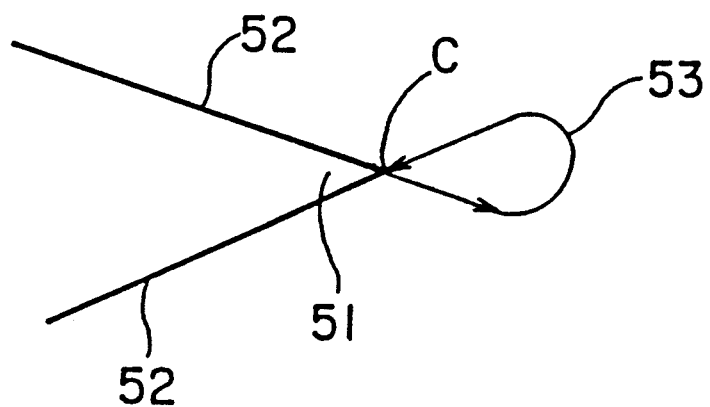
FIG. 7 is a diagram illustrating a cutting operation by a loop process.

FIG. 6 is a block diagram showing the arrangement of an NC laser device to which this invention is applied. In the figure, a processor 61 reads out the machining program I (FIG. 2) stored in a memory 70 and controls the entire operation of the NC laser device, in accordance with a control program stored in a ROM, not shown. The decoding means 2, the acceleration/deceleration control means 3, and the interpolating means 4 shown in FIG. 2 are implemented by this ROM and the processor 61.

An output control circuit 62 has a built-in D/A converter and converts an output command value from the processor 61 into a current command value. An excitation power supply 63 for excitation rectifies a commercial power, carries out a switching operation to thereby generate a high-frequency voltage, and supplies a high-frequency current corresponding to the current command value to a discharge tube 64. The output control circuit 62 and the excitation power supply 63 constitute the laser beam control means shown in FIG. 2.

A laser gas 79 is circulated through the discharge tube 64, and is excited by an electric discharge when the high-frequency current from the excitation power supply 63 is applied thereto. A rear mirror 65 is made of germanium (Ge) and has a reflectivity of 99.5%, and an output mirror 66 is made of zinc selenide (ZnSe) and has a reflectivity of 65%. These mirrors constitute a Fabry-Perot resonator which amplifies 10.6 μm light emitted from the molecules of the excited laser gas, and outputs part of the light to the outside of the output mirror 66 as a laser beam 67.

When a shutter 83a is open, the outgoing laser beam 67 is deflected by a bender mirror 68, converged to a spot below 0.2 mm or less by a light focusing lens 69, and irradiated onto a surface of the workpiece 9.

The memory 70 is a nonvolatile memory for storing various parameters and the like, and a CMOS backed up by a battery is used therefor. Although not shown in the figure, other memories such as a ROM storing a system program and a RAM for temporarily storing data are provided.

A position control circuit 71 controls the rotation of a servomotor 73 through a servo amplifier 72 in accordance with a command from the processor 61, whereby the movement of a table 76 (machine 6), and accordingly, the position of the workpiece 9, is controlled by a ball screw 74 and a nut 75. Although the figure shows only one axis, in practice a plurality of control axes are provided. A CRT, a liquid-crystal display device or the like is used for a display device 78.

A Roots blower is used for a blower 80, to circulate the laser gas 79 through cooling units 81a and 81b. The cooling unit 81a cools the laser gas 79 that has been heated to high temperatures due to the laser oscillation, and the cooling unit 81b removes heat generated due to the gas compression by the blower 80.

A shutter control circuit 82 opens and closes the shutter 83a in accordance with a command from the processor 61. The shutter 83a is made of a copper or aluminum plate plated with gold, and when closed, reflects the laser beam 67 emitted from the output mirror 66 to a beam absorber 83b to be absorbed thereby. When the shutter 83a is open, the laser beam 67 is irradiated onto the workpiece 9.

A power sensor 84 comprises a thermocouple, photoelectric converting element or the like, and receives a laser beam partly transmitted through the rear mirror 65, to thereby measure the output power of the laser beam 67. An A/D converter 85 converts the output of the power sensor 84 into a digital value to be supplied to the processor 61.

In the foregoing description, the laser output command is changed in accordance with a change in the feed speed when the movement for machining is restarted, but this command can be changed from the piercing condition to the cutting condition during the time taken to cover a predetermined distance after the restart of the movement.

Furthermore, in the above description, although the times for the deceleration and acceleration are the same ($\Delta T$), these times may be different.

As described above, according to this invention, when the feed speed is decelerated before reaching an acute-angle portion, and is accelerated after the acute-angle portion has been passed, the laser output command is changed in accordance with a change in the feed speed, and therefore, the quantity of heat applied to the acute-angle portion can be property controlled. Further, the feed speed is once made zero at the acute-angle portion, a piercing operation is carried out by passing the laser beam perpendicularly through the workpiece, and thereafter, the feed direction is changed, whereby a sharp cut edge of the workpiece can be made from the upper to bottom surface thereof, and accordingly, an acute-angle portion can be obtained without using the loop machining method.

We claim:

1. A laser beam machining method for cutting a workpiece in accordance with a machining program composed of a succession of move commands and laser output commands, comprising the steps of:
    calculating an angle of a machining path in accordance with a move command under execution and a subsequent read out move command;
    comparing the angle of the machining path with a preset angle;
    decelerating and stopping a movement for a machining based on the move command under execution, when the angle of the machining path is more acute than the preset angle;
    changing the laser output command from a cutting condition to a piercing condition in accordance with the deceleration and stoppage of the movement for machining;
    restarting the movement for machining in accordance with the subsequent move command when a piercing operation according to the piercing condition is completed; and
    changing the laser output command from the piercing condition to the cutting condition in accordance with the movement for machining, when the movement for machining is restarted.

2. A laser beam machining method according to claim 1, wherein, when the movement for machining is decelerated and stopped, the laser output command is changed linearly from the cutting condition to the piercing condition in accordance with a change of a deceleration of the movement for machining.

3. A laser beam machining method according to claim 1, wherein, when the movement for machining is decelerated and stopped, the laser output command is changed from the cutting condition to an intermediate condition, between the cutting condition and the piercing condition, during the deceleration of the movement for machining, in accordance with a change in the deceleration, and is switched to the piercing condition when the movement for machining is stopped.

4. A laser beam machining method according to claim 1, wherein, when the movement for machining is decelerated and stopped, the laser output command is maintained at the cutting condition during the deceleration, and is switched to the piercing condition when the movement for machining is stopped.

5. A laser beam machining method according to claim 1, wherein, when the movement for machining is restarted, the laser output command is changed linearly from the piercing condition to the cutting condition in accordance with a change in a feed speed of the movement for machining.

6. A laser beam machining method according to claim 1, wherein, when the movement for machining is restarted, the laser output command is changed from the piercing condition to the cutting condition in accordance with a movement for machining over a predetermined distance.

7. A laser beam machining method according to claim 1, wherein the laser output command includes at least one of factors related to power, pulse frequency, and pulse duty.

* * * * *